Aug. 21, 1923. 1,465,308

S. S. MATTHES

SWITCH AND OVERHEAD SYSTEM

Filed Aug. 2, 1922

Witness
H. J. Stromberger.

Inventor
Samuel S. Matthes.
By
Attorney

Patented Aug. 21, 1923.

1,465,308

UNITED STATES PATENT OFFICE.

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

SWITCH AND OVERHEAD SYSTEM.

Application filed August 2, 1922. Serial No. 579,154.

*To all whom it may concern:*

Be it known that I, SAMUEL S. MATTHES, a citizen of the United States of America, residing at Mansfield, in the county of Richland and State of Ohio, have invented certain new and useful Improvements in a Switch and Overhead System, of which the following is a specification.

My invention relates to supporting devices for trolley wires and relates more particularly to that class of device called a switch, frog or crossover whereby the direction of travel of the trolley wheel with respect to the trolley wire is changed, or the path of the trolley wheel is maintained at the point of crossing another conductor.

Also my invention relates to an overhead construction in which such frogs, crossings or switches are used and whereby in trackless trolley operation utilizing two overhead current collectors, the trolley bus can make a complete turn for a return journey.

With the advent of what is known as trackless trolley operation where the trolley bus must operate on the roadway and to either side of the trolley wire, it is found that some positive means must be installed at the points of turnout or crossing to properly guide the current collectors which conduct the current from the trolley wire to the trolley bus so that they will maintain contact with the proper trolley wire or maintain a proper direction of travel.

The object of my device is that of causing the trolley wheel to take the proper direction of travel at a turnout or to maintain the proper direction of travel at a crossing.

Another object of my invention is an overhead system for a loop return in which two trolley wires are used of different polarity such that the vehicle may make a complete turn and start on its return journey without the necessity of any attention whatsoever being given the current collectors which are in contact with the trolley wires.

My invention resides in the novel construction, arrangement and combination of various parts as herein more fully described and set forth in this specification and in the accompanying drawing.

In the drawing accompanying the specification:

Figure 1:
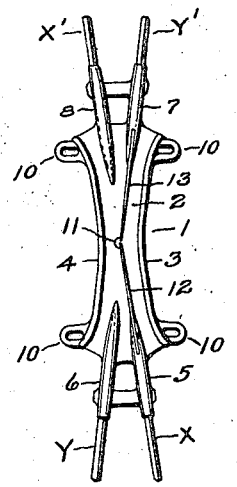
Figure 1 is a bottom plan view of a device for maintaining the direction of travel of the trolley wheel where two conductors cross each other.
Figure 2:
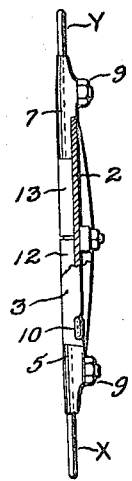
Fig. 2 is a side view of Fig. 1 with a portion of the side flange broken away.

In my preferred form of constructing a crossing shown in Figs. 1 to 4, inclusive, I employ a body member 1 which has a base plate 2 and flanges 3 and 4. Projecting from either end of the base plate 2 are the tongues 5, 6, 7 and 8 to which the trolley wires X—X' and Y—Y' are secured by means of clamping members 9. The construction of the arms 5, 6, 7 and 8 and clamping members 9 are not detailed as there are various forms of these which are well known to the trade and in common use every day, and I have made no claim for any specific construction of these arms and clamping members. To the body member are secured eye members 10 by means of which the device may be supported and held rigidly in position by means of stranded cable, etc., secured thereto.

Near the center of the body member and projecting at right angles to the base member 2 is a post or similar rigid member 11. To one end of each of the arm members 5 and 7 is rigidly secured one end of the flat spring members 12 and 13 respectively. The other end of each of these springs presses against the member 11, and is held under a sufficient tension to maintain the spring in contact with the post 11 but the adjacent ends of the springs 12 and 13 are each free to be moved in a direction away from the post 11 and independently of each other. The distance between the flanges 3 and 4 at a point adjacent the member 11 is sufficiently wide to permit the passage of a trolley wheel therebetween, but the distance between the flange 4 and the member 11 must be such as to force the trolley wheel groove to ride over the post 11.

Figure 3:
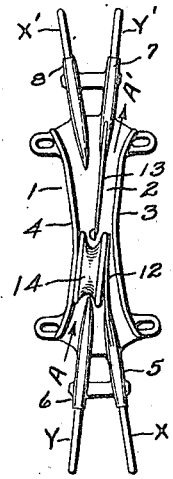
Fig. 3 is a view of the device shown in Fig. 1 with a trolley wheel traveling in the direction A and showing the operation of the device for compelling the trolley wheel to take its proper course.

In the operation of my device, referring to Fig. 3, assuming that a trolley wheel 14 rides along the trolley wire Y in the direction of the arrow A, when it has left the arm 6 it will engage with the spring 12 and the flange 4 and as its travel proceeds it will force the spring 12 to the right as shown on account of its engagement with the rigid flange 4, and when it has reached the center of the device the groove will pass over the member 11 and straddle the spring 13 which will guide the wheel on to the arm 7 thereby maintaining the path of travel of the trolley wheel in the direction of the arrows A—A' and from the wire Y on to the wire Y'. After the trolley wheel 14 has passed on to the spring 13 the spring 12 will return to its normal position with its inner end in engagement with the member 11.

Figure 4:
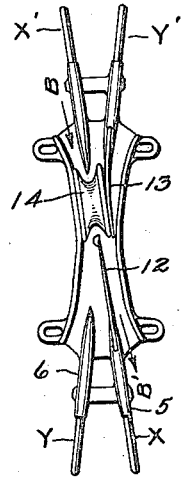
Fig. 4 is a view of the device shown in Fig. 1 in which the trolley wheel is traveling in the direction B, that is, directly opposite that shown in Fig. 3.

In Fig. 4 is shown the operation of the device when the travel of the wheel is along the wire X'—X in the direction of the arrows B—B'. Here the operation is the same as that described in Fig. 3 excepting that the trolley wheel operates the spring 13 and the spring 12 guides the wheel on to the arm 5 and prevents its engaging with the arm 6 and passing on to the wire Y.

Figure 5:
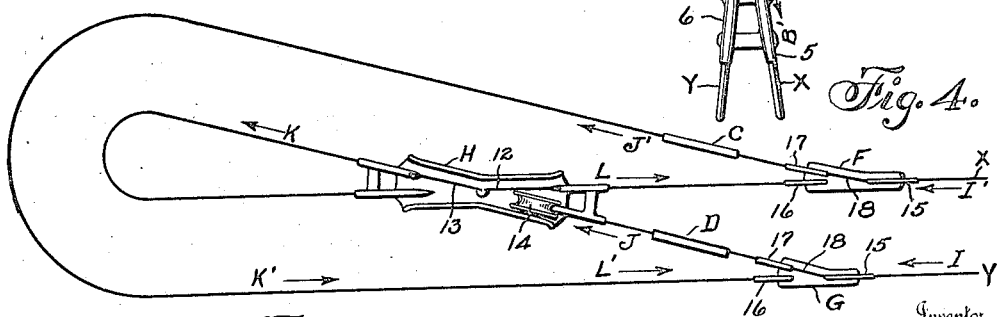
Fig. 5 is a schematic drawing showing how the device in Fig. 1 is used in connection with a loop arrangement of the trolley wire, and also shows two turnout devices causing the direction of the trolley wheel to be positively changed, but employing the same principle of construction as used in Figs. 1 to 4, inclusive.

In Fig. 5 I have shown a schematic loop arrangement of the trolley wire whereby the trolley bus is permitted to make a complete turn at its destination ready to make a return trip. Here are shown the trolley wires spaced apart and forming the loop arrangement stated. As these wires are of opposite polarities, it is necessary at certain points to introduce the section insulators C and D in order to prevent short circuiting. At the turnout points are shown the frogs or switches F and G. These devices are also constructed with arms 15, 16 and 17 to which the trolley wires are secured and between the arms 15 and 17 is a spring member 18 having one end rigidly secured to the arm 17 and the other end lightly pressing against the arm 15. Where the two conductors cross is a crossing member H similar to that shown in Fig. 1.

A trolley wheel entering upon the wire X will follow along the path and in the direction of the arrows I', J', K', L' and leave the loop by the trolley wire Y. In this operation the trolley wheel would be guided along the switch F in the proper direction by the spring 18 and back down to the trolley wire Y through the switch G where the spring 18 would be depressed. The trolley wheel which engaged with the conductor Y at the time the car commenced to make the loop would take the path and direction indicated by the arrows I, J, K and L and leave the loop by the trolley wire or conductor X. In this case the spring 18 and the switch G would each guide one of the trolley wheels on to the arm 17 and when one of the trolley wheels reached the crossing H the spring 12 would be deflected and as the wheel continued to travel it would engage with the spring 13 and follow the trolley wire in the direction of the arrow K and when it again reached the crossing H the spring 13 would be depressed and the spring 12 would guide the trolley wheel in the direction of the arrow L. When the wheel reached the switch F the spring 18 would be deflected permitting the wheel to pass on to the arm 15 and from there to the trolley wire X.

The use of the two pole arrangement for collecting current for use on trolley busses in which the trolley bus is permitted to move at will to either side of the trolley conductor has brought into use, under some conditions, a trolley collector which is free to swivel in either direction about a vertical axis and when such a device is used, unless there is proper guiding means, the collecting element will pivot freely when it is passing over a crossing or switch of the usual type of construction and, therefore, guiding means must be used which will make the direction of movement of the current collector positive as to the direction in which it should move. The arrangement described in this specification and shown in the accompanying drawing will permit the current collector to maintain the proper direction of travel.

There are, of course, many modifications which may be made in my invention which will be apparent to those skilled in the art and the principle thereof may be applied to other devices of a similar nature than that specifically set forth herein and I, therefore, do not wish to be limited other than by the following claims.

I claim:

1. A trolley switch comprising a body member, two pairs of arms secured to the body member with one arm of each pair oppositely disposed and in line with the other arm of the pair, for guiding a current collector from a trolley wire onto the body member and vice versa and resilient guide member and having one end secured to one of the arms of each pair and having their free ends movable laterally in one direction only.

2. A trolley switch comprising a body member having flanges forming a passage to guide a passing current collector, two pairs of arms secured to the body member with one arm of each pair at opposite ends of the passage and having each arm in line with one of the opposite arms and resilient guide members having one end rigidly secured to one of the arms at each end of the passage and their free ends engaging a stop member, each resilient guide yieldable laterally in one direction only to the passage of the current collector in one direction only.

3. A trolley switch comprising a body member, two pairs of guide arms secured to the body member with the arms of each pair oppositely disposed for guiding a current collector onto and off of the body member, and resilient guide members having one end secured to one of the arms of each pair and having their free ends adjacent and movable laterally in one direction only.

4. A trolley switch comprising a body member, two pairs of guide arms secured to the body member with the arms of each pair oppositely disposed for guiding a current collector onto and off of the body member, and resilient guide members having one end secured to one of the arms of each pair and having their free ends adjacent and movable laterally in one and the same direction only.

5. A trolley switch comprising a body member, two pairs of guide arms secured to the body member with the arms of each pair oppositely disposed for guiding a current collector onto and off of the body member, resilient guide members having one end secured to one of the arms of each pair and having their free ends adjacent and movable laterally and means engaging the free ends to prevent lateral movement in one direction only.

6. A trolley switch comprising a body member, two pairs of guide arms secured to the body member with the arms of each pair oppositely disposed for guiding a current collector onto and off of the body member, resilient guide members having one end secured to one of the arms of each pair and having their free ends adjacent and movable laterally and means to prevent lateral movement thereof in one direction only.

7. A trolley switch comprising a body member, two pairs of guide arms secured to the body member and having the arms of each pair oppositely disposed and in line for guiding a current collector onto and off of the body member, resilient guide members having one end secured to one of the arms of each pair and their free ends adjacent and movable laterally in one direction to guide the current collector from the body member onto one of the arms and means on the body member to engage the current collector to force it into engagement with one of the resilient guide members to deflect the same laterally and into guiding relation with the other resilient member for the purpose described.

8. A trolley switch comprising a body member, two pairs of guide arms secured to the body member with the arms of each pair oppositely disposed for guiding a current collector onto and off of the body member, and resilient guide members each having one end secured to one of the arms of each pair and their free ends adjacent and movable laterally and independently of each other.

9. A trolley switch comprising a body member, two pairs of guide arms secured to the body member with the arms of each pair oppositely disposed for guiding a current collector onto and off the body member in a pre-arranged direction, resilient guide members each having one end secured to one of the arms of each pair and their free ends adjacent and movable laterally and independently of each other and means to engage the current collector to force it into engagement with one of the resilient guide members to deflect the same laterally and into guiding relation with the other resilient member for the purpose described.

10. A trolley switch comprising a body member having a channel therethrough and open at opposite ends, two arms secured to the body member at each open end and projecting into the channel, the opposite arms being in alinement such that a straight line connecting two of the arms will cross a straight line connecting the other two arms, a yielding guide member having one end secured to one of the arms for guiding the current collector through the channel and onto the diametrically opposite arm and a yielding guide member secured to one of the arms at the opposite opening of the channel for guiding the current collector through the channel in the opposite direction and along a different path.

11. A trolley switch comprising a body member provided with flanges forming a channel open at opposite ends and acting as a guide for a current collector, two arms secured to the body member at each open end and projecting into the channel, two of the opposite arms being in alinement such that a line connecting two of the alined arms will cross a line connecting the other two alined arms, a member secured to the body member and projecting therefrom at a point coinciding with the point of crossing of the said connecting lines and flexible guide members secured to one of the arms at each end of the channel and having their free ends terminating at practically the point of crossing of said connecting lines and free to yield laterally under pressure of the current collector in one direction and held from lateral yielding in the other direction by the aforesaid projecting member.

In testimony whereof I affix my signature.

SAMUEL S. MATTHES.